United States Patent
Cornelius

(10) Patent No.: US 9,476,543 B2
(45) Date of Patent: Oct. 25, 2016

(54) ALIGNMENT SWIVEL AND METHOD

(71) Applicant: UTC Fire & Security Corporation, Farmington, CT (US)

(72) Inventor: Dirk Lee Cornelius, Bloomington, MN (US)

(73) Assignee: DETECTOR ELECTRONICS CORPORATION, Minneapolis, MN (US)

( * ) Notice: Subject to any disclaimer, the term of this patent is extended or adjusted under 35 U.S.C. 154(b) by 0 days.

(21) Appl. No.: 14/650,725

(22) PCT Filed: Oct. 29, 2013

(86) PCT No.: PCT/US2013/067201
§ 371 (c)(1),
(2) Date: Jun. 9, 2015

(87) PCT Pub. No.: WO2014/092869
PCT Pub. Date: Jun. 19, 2014

(65) Prior Publication Data
US 2015/0330563 A1    Nov. 19, 2015

Related U.S. Application Data

(60) Provisional application No. 61/735,147, filed on Dec. 10, 2012.

(51) Int. Cl.
*E04G 3/00*       (2006.01)
*F16M 13/02*      (2006.01)
(Continued)

(52) U.S. Cl.
CPC ............ *F16M 13/022* (2013.01); *F16M 11/08* (2013.01); *F16M 11/18* (2013.01); *F16M 11/2021* (2013.01); *F16M 13/02* (2013.01); *Y10T 29/49828* (2015.01); *Y10T 29/49964* (2015.01)

(58) Field of Classification Search
CPC .... F16M 13/022; F16M 11/08; F16M 11/18; F16M 11/2021; F16M 13/02; Y10T 29/49828; Y10T 29/49964
USPC .................. 248/218.4, 219.4, 229.14, 229.4, 248/231.61, 276.1, 278.1
See application file for complete search history.

(56) References Cited

U.S. PATENT DOCUMENTS

| 5,128,770 A | 7/1992 | Inana et al. |
| 5,224,675 A | 7/1993 | Ellenberger et al. |

(Continued)

FOREIGN PATENT DOCUMENTS

| DE | 9300408 U1 | 6/1994 |
| DE | 19540298 A1 | 4/1997 |

(Continued)

OTHER PUBLICATIONS

International Search Report for application PCT/US2013/067201, dated May 22, 2014, 5 pages.

(Continued)

*Primary Examiner* — Gwendolyn Baxter
(74) *Attorney, Agent, or Firm* — Cantor Colburn LLP

(57) ABSTRACT

An apparatus for mounting a device, an adjustable swivel mount, and a method are provided. The apparatus includes a bracket (106) and a shaft (108) pivotally coupled therewith. The apparatus also includes a first adjustment knob (143), with rotation of the first adjustment knob causing the shaft to pivot about a first axis (Y). The apparatus further includes a swivel bracket (144) coupled with the shaft, and a first paddle (128) coupled with the swivel bracket. The apparatus further includes a second adjustment knob (136), with rotation of the second adjustment knob causing the first paddle to pivot about a second axis (X). The apparatus also includes a mount (100) coupled to the first paddle and configured to couple to the device. Pivoting the first paddle about the first axis causes the mount to pivot about the first axis, and pivoting the first paddle about the second axis causes the mount to pivot about the second axis.

20 Claims, 6 Drawing Sheets

(51) Int. Cl.
*F16M 11/08* (2006.01)
*F16M 11/18* (2006.01)
*F16M 11/20* (2006.01)

(56) References Cited

U.S. PATENT DOCUMENTS

| | | | |
|---|---|---|---|
| 5,463,432 A | 10/1995 | Kahn | |
| 5,649,955 A | 7/1997 | Hashimoto et al. | |
| 5,749,556 A | 5/1998 | Matsuoka et al. | |
| 5,850,579 A | 12/1998 | Melby et al. | |
| 6,076,266 A | 6/2000 | Beckingham et al. | |
| 6,203,216 B1 | 3/2001 | Koizumi | |
| 6,354,750 B1 | 3/2002 | Romanoff | |
| 6,517,207 B2 | 2/2003 | Chapman | |
| 6,659,417 B2 | 12/2003 | Hsieh | |
| 6,664,937 B2 * | 12/2003 | Vermette | H01Q 1/125 248/278.1 |
| 6,705,774 B2 | 3/2004 | Tashiro et al. | |
| 6,766,995 B1 | 7/2004 | Hsieh | |
| 6,880,987 B2 | 4/2005 | Diana et al. | |
| 7,473,041 B2 | 1/2009 | Stanev et al. | |
| 7,490,804 B2 * | 2/2009 | Oh | F16M 11/10 248/278.1 |
| 7,552,661 B2 | 6/2009 | Diana et al. | |
| 7,555,970 B2 | 7/2009 | Hawkes et al. | |
| 7,762,513 B2 | 7/2010 | Sawai et al. | |
| 7,804,265 B2 | 9/2010 | Hoermann | |
| 7,811,008 B2 | 10/2010 | Dumm | |
| 7,855,728 B2 | 12/2010 | Aoki | |
| 8,001,697 B2 | 8/2011 | Danielson et al. | |
| 8,020,824 B2 * | 9/2011 | Pan | F16M 11/08 248/222.51 |
| 8,181,921 B2 | 5/2012 | Shi et al. | |
| 8,201,974 B1 | 6/2012 | Smith et al. | |
| 8,220,760 B2 | 7/2012 | Fetzer et al. | |
| 8,794,578 B2 * | 8/2014 | Lin | H01Q 1/1228 248/218.4 |
| 8,866,695 B2 * | 10/2014 | Renilson | H01Q 1/1228 248/218.4 |
| 2007/0164177 A1 | 7/2007 | Peterson et al. | |
| 2008/0277551 A1 * | 11/2008 | Hackney | E04B 1/2604 248/276.1 |
| 2008/0278578 A1 | 11/2008 | Kahn | |
| 2011/0019074 A1 | 1/2011 | Lee | |
| 2011/0031360 A1 | 2/2011 | Pan | |
| 2011/0268433 A1 | 11/2011 | Yim et al. | |
| 2015/0083875 A1 * | 3/2015 | Lloyd | H01Q 1/1228 248/218.4 |

FOREIGN PATENT DOCUMENTS

| | | |
|---|---|---|
| DE | 102010036405 A1 | 1/2012 |
| FR | 569875 A | 4/1924 |
| FR | 2948524 B1 | 7/2012 |
| JP | 2791092 B2 | 8/1998 |
| JP | 2000270316 A | 9/2000 |

OTHER PUBLICATIONS

Written Opinion for application PCT/US2013/067201, dated May 22, 2014, 5 pages.

* cited by examiner

ALIGNMENT SWIVEL AND METHOD

CROSS-REFERENCE TO RELATED APPLICATIONS

This application claims priority to U.S. Provisional Patent Application Ser. No. 61/735,147, filed on Dec. 10, 2012. The entirety of the priority provisional application is incorporated herein by reference in its entirety.

TECHNICAL FIELD

The present disclosure relates to component mounts, for example, including one or more alignment swivels.

BACKGROUND

A variety of devices may require alignment during installation, e.g., when mounted to a support structure such as a pole, beam, wall, etc. For example, some devices receive and/or transmit light-based signals, e.g., laser signals, across a distance. The receivers for the light-based signals may have a relatively small receiving area, and thus precisely aligning the transmitter and receiver, such that the transmitted signal is incident on the receiving area, may enable proper functioning of the devices. One example of such device is a gas detection system; however, a variety of other devices benefit from such precise alignment.

To provide precise alignment, adjustable component mounts are often employed, which allow the receiver or transmitter (depending on what is being mounted) to be adjusted over a range of positions. Generally, these mounts include bolts and slots, etc., allowing the user to slide or pivot one or more portions of the mount so as to adjust the angle and/or position of the device secured to the mount. The mounts also typically include positional locking mechanisms to fix the position of the mount, once selected, so that the mount is not inadvertently displaced during operation.

However, a challenge to employing such mounts exists in providing precision alignment. The locking/unlocking actions can slightly move the mount out of the selected position. Further, adjusting one portion of the mount may result in another adjustable portion of the mount being incidentally moved, throwing the device out of alignment. Thus, precisely aligning the component often requires a trial-and-error process, whereby multiple alignment possibilities are resolved and the mount is finally locked in the desired location. In situations where multiple device installations may occur, this trial-and-error process can result in significant installation delays.

What is needed then are efficient apparatus and methods for mounting a device in precise alignment.

SUMMARY

Embodiments of the disclosure may provide an apparatus for mounting a device. The apparatus includes a bracket configured to be coupled to a support structure, and a shaft pivotally coupled with the bracket. The apparatus also includes a first adjustment knob, with rotation of the first adjustment knob causing the shaft to pivot about a first axis. The apparatus further includes a swivel bracket coupled with the shaft such that the shaft pivoting causes the swivel bracket to pivot about the first axis, and a first paddle coupled with the swivel bracket such that the swivel bracket pivoting about the first axis causes the first paddle to pivot about the first axis. The apparatus further includes a second adjustment knob, with rotation of the second adjustment knob causing the first paddle to pivot about a second axis. The apparatus also includes a mount coupled to the first paddle and configured to couple to the device. Pivoting the first paddle about the first axis causes the mount to pivot about the first axis, and pivoting the first paddle about the second axis causes the mount to pivot about the second axis.

Embodiments of the disclosure may also provide a method for mounting a device. The method may include coupling the device to a mount of an adjustable swivel mount, and rotating a first adjustment knob disposed on a side of the adjustable swivel mount. Rotating the first adjustment knob causes a shaft coupled to a bracket of the adjustable swivel mount to pivot about a first axis. The shaft pivoting about the first axis causes the mount to pivot about the first axis. The method may also include rotating a second adjustment knob disposed on the side of the adjustable swivel mount. Rotating the second adjustment knob causes a paddle coupled to a swivel bracket to pivot about the second axis, and the paddle pivoting about the second axis causes the mount to pivot about the second axis.

Embodiments of the disclosure may further provide an adjustable swivel mount. The adjustable swivel mount may include a base plate configured to be secured to a support surface, and a bracket extending substantially normal to the base plate, the bracket defining a shaft hole and a lock hole therein. The adjustable swivel mount may further include a first swivel assembly. The first swivel assembly may include a first shaft received through the shaft hole and pivotal with respect to the bracket, and a first paddle extending from the shaft and defining a first opening. The first swivel assembly may also include a first ball including a first flapper and defining a first ball opening, with the first ball being received into the first opening. The first swivel assembly may also include a first plate coupled with the first paddle and defining an opening into which the first ball is received, so as to pivotally entrain the first ball between the first plate and the first paddle. The first plate, the first paddle, or both define a slot into which the first flapper is received. The first swivel assembly may also include a first shank received into the first ball opening, and a first adjustment knob coupled with the first shank, such that rotation of the first adjustment knob causes the first shank to rotate and rotation of the first shank causes the first ball to move along the first shank and pivot the shaft about a first axis. The adjustable swivel mount may also include a second swivel assembly. The second swivel assembly may include a swivel bracket fixed to the shaft and a pin received through the swivel bracket. The second swivel assembly may also include a second paddle pivotally coupled to the swivel bracket by the pin, with the second paddle defining a second opening. The second swivel assembly may also include a second ball including a second flapper and defining a second ball opening, with the second ball being received into the second opening of the second paddle. The second swivel assembly may further include a second plate coupled with the second paddle and defining an opening into which the second ball is received, so as to pivotally entrain the second ball between the second plate and the second paddle. The second plate, the second paddle, or both define a slot into which the second flapper is received. The second swivel assembly may also include a second shank received into the second ball opening, and a second adjustment knob coupled with the second shank, such that rotation of the second adjustment knob causes the second shank to rotate. Rotation of the second shank causes the second ball to move along the second shank and pivot the second paddle about a second axis. The adjustable swivel mount may also include a mount coupled with the first and second swivel assemblies, such that pivoting the shaft of the first swivel assembly pivots the mount about the first axis and pivoting the second paddle of the second swivel assembly pivots the mount about the second axis.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to various embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

Figure 1:
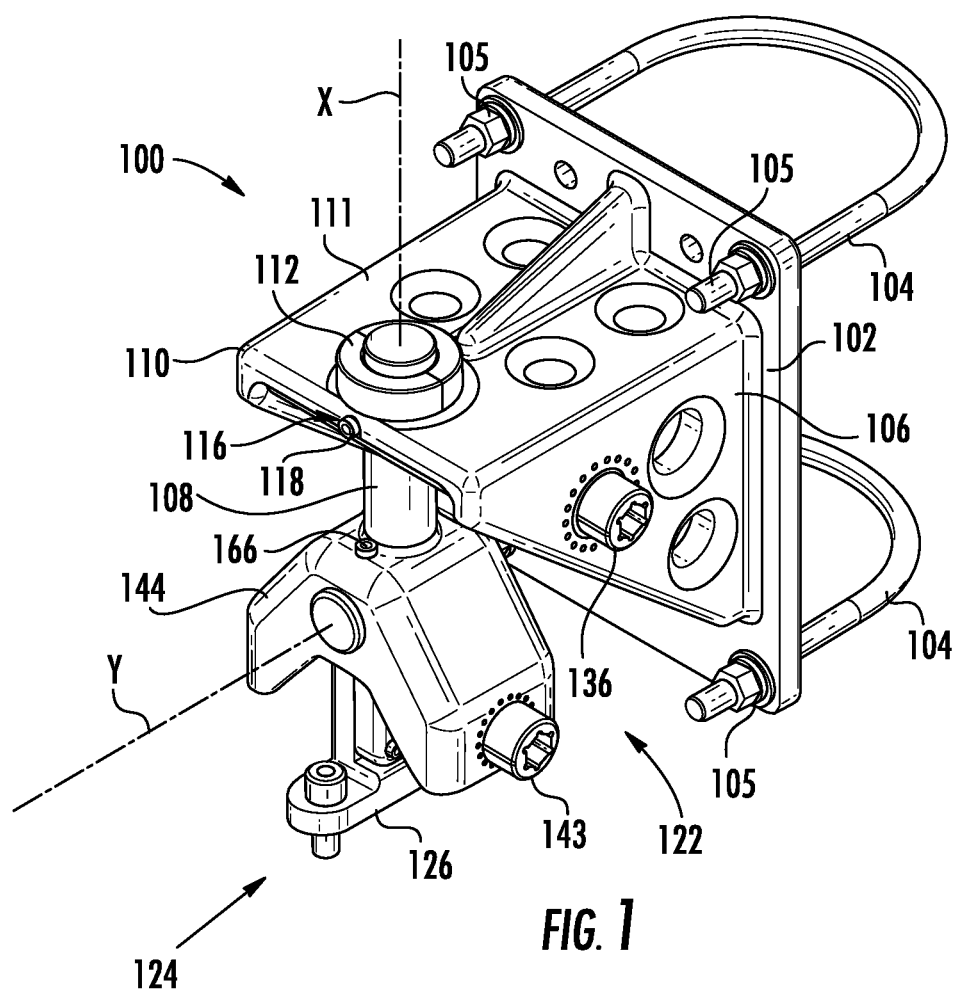
FIG. 1 illustrates a raised perspective view of an adjustable swivel mount, according to an embodiment.
Figure 2:
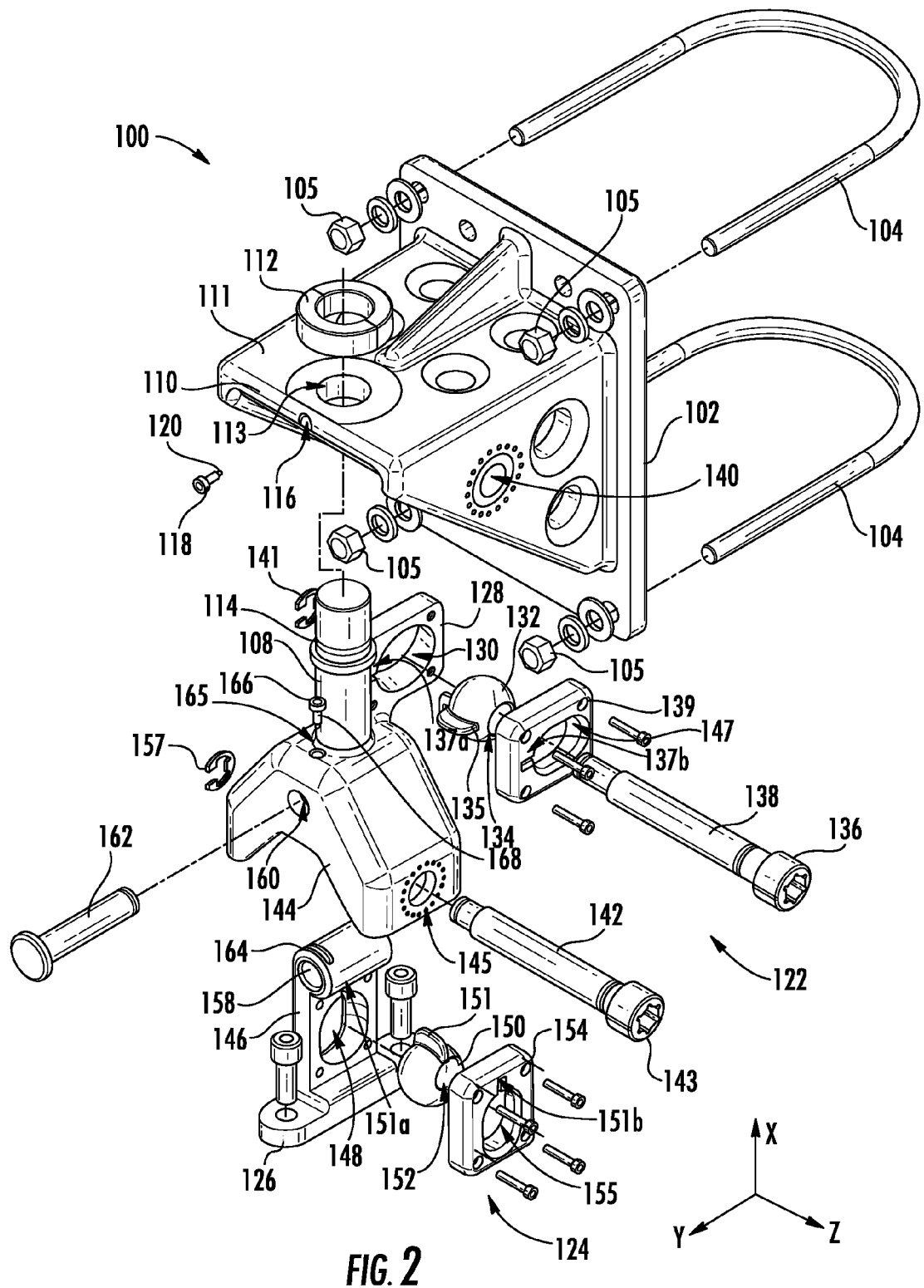
FIG. 2 illustrates an exploded, perspective view of the adjustable swivel mount, according to an embodiment.

FIGS. 1 and 2 illustrate a perspective view and an exploded view, respectively, of an adjustable swivel mount 100, according to an embodiment. The adjustable swivel mount 100 may include a base plate 102, which may be configured to be coupled with hangers 104, e.g. via nuts 105. As shown, the hangers 104 may be U-shaped bars, which may be configured to be disposed around a post, beam, pole, etc. so as to secure the adjustable swivel mount 100 thereto. In other embodiments, the hangers 104 may be or include one or more screws, bolts, rivets, other fasteners, welds, adhesives and/or any other support structure capable of securing the position of the base plate 102 to a wall, ceiling, surface, post, beam, pole, or any other structure.

The adjustable swivel mount 100 may also include a bracket 106, which may be coupled with (e.g., welded, brazed, adhered, and/or fastened to or integral with) the base plate 102. The bracket 106 may extend perpendicular or substantially perpendicular to the base plate 102, as shown, or at any other desired angle with respect thereto. Further, the bracket 106 may have a generally triangular cross-section, similar to a truss, as it may be configured to transmit the weight of a device to the support structure via the base plate 102 and the hangers 104. However, in other embodiments, the bracket 106 may be any other shape and transmit the weight of the device in any other fashion.

The adjustable swivel mount 100 may further include a shaft 108, which may be pivotally coupled to the bracket 106, for example, proximal a distal end 110 of a top surface 111 of the bracket 106. The shaft 108 may be coupled with the bracket 106 so as to transmit linearly-directed loads thereto, while being able to rotate under torque forces. For example, the shaft 108 may be received through a shaft hole 113 in the bracket 106 and supported with a nut or bushing 112. The bushing 112 may have a diameter that exceeds the diameter of the shaft hole 113, and may be configured to retain a portion of the shaft 108 extending through the shaft hole 113, provide a low-friction engagement between the shaft 108 and the top surface 111, or both. For example, the bushing 112 may be threaded to receive a threaded portion of the shaft 108, or may be locked to the shaft 108 in any other manner. In some embodiments, other structures may be provided to retain the shaft 108 received through the shaft hole 113.

The shaft 108 may further define a groove 114 therein, which may be positioned on the shaft 108 such that the groove 114 is slightly below the top surface 111 of the bracket 106 when the shaft 108 is received and positioned through the shaft hole 113. The groove 114 may extend partially or entirely around the shaft 108. The bracket 106, in turn, may define a lock hole 116 extending from the distal end 110 and transverse to the shaft hole 113, such that the lock hole 116 intersects the shaft hole 113. In at least one embodiment, the lock hole 116 may be threaded. Further, the adjustable swivel mount 100 may include a lock bolt 118, which may be received, e.g., threaded, into the lock hole 116, such that a distal tip 120 of the lock bolt 118 is disposed in the groove 114. The cross-section of the distal tip 120 of the lock bolt 118 may have a complementary shape to a cross-section of the groove 114, such that the groove 114 snugly receives the lock bolt 118. The lock bolt 118 may be advanced perpendicular to and toward the central axis of the shaft 108 and into the groove 114, so as to retain the position of the shaft 108 extending through the bracket 106. Accordingly, the shaft 108 may be locked while avoiding an application of torque on the shaft 108.

The adjustable swivel mount 100 may also include a first swivel assembly 122 coupled to the shaft 108 and a second swivel assembly 124 coupled to the first swivel assembly 122. In some circumstances, the shaft 108 may be considered to be part of the first swivel assembly 122. Additionally, the adjustable swivel mount 100 may include a mount 126, which may be configured to secure to a device being mounted by the adjustable swivel mount 100. The first swivel assembly 122 may be configured to provide pivotal adjustment of the mount 126 (and, thus to a device, such as a laser transmitter in a gas detection system, for example, secured thereto) about an X-axis, while the second swivel assembly 124 may be configured to provide pivotal adjustment of the mount about a Y-axis.

Still referring to FIGS. 1 and 2, the first swivel assembly 122 may include a paddle 128 coupled to, integral with, or otherwise extending from the shaft 108. The paddle 128 may define an opening 130 extending therethrough. The first swivel assembly 122 may also include a force-translating member 132 which may be receivable into the opening 130 of the paddle 128. The opening 130 may be sized, e.g., tapered, so as to prevent the force-translating member 132 from traversing entirely through the opening 130.

In various embodiments, the force-translating member 132 may be a "ball" which may be spherical, spheroid, hemispherical, or the like, so as to facilitate the paddle 128 pivoting therearound. However, other shapes for the force-translating member 132, such as a cylinder or any prismatic shape, etc. may be employed. In some embodiments, the force-translating member 132 may be a rod or bar that extends across the opening 130 of the paddle 128, for example, into blind holes, slots, etc. defined therein, and may be free to rotate therein.

The force-translating member 132 may also include an opening 134. In embodiments in which the force-translating member 132 is a ball or the like, the opening 134 may extend therethrough. In other embodiments, the opening 134 may be otherwise defined. For example, in an embodiment in which the force-translating member 132 is a rod, an extension from the rod may be provided and may define the opening 134.

In at least one embodiment, the first swivel assembly 122 may include a plate 139 configured to be secured, e.g., fastened, to the paddle 128. The plate 139 may define an opening 147 therethrough, which may be sized to receive the force-translating member 132, while preventing it from sliding entirely therethrough. Accordingly, the plate 139 may be secured to the paddle 128 with the force-translating member 132 therebetween. The openings 130, 147 may prevent the force-translating member 132 from escaping from between the paddle 128 and the plate 139, and thus the force-translating member 132 may be entrained therebetween and held in a pivotal linkage with the paddle 128, and thus the shaft 108.

Further, the first swivel assembly 122 may include an adjustment knob 136, with a shank 138 extending therefrom. The shank 138 and the adjustment knob 136 may be integrally formed from a single piece or may be formed from two or more separate pieces coupled together. In at least one embodiment, the shank 138 may be at least partially threaded. The shank 138 may be receivable in the opening 134 of the force-translating member 132. In at least one embodiment, the opening 134 of the force-translating member 132 may also be threaded, such that the threads of the shank 138 mesh with the threads of the opening 134 of the force-translating member 132.

Further, the shank 138 may be received through a hole in the reverse side (not visible) of the bracket 106. The first swivel assembly 122 may include a shaft lock 141, which may be receivable onto the shank 138, such that the shaft lock 141 may bear on the reverse side of the bracket 106. Accordingly, in addition to the adjustment knob 136, the shaft lock 141 may serve to retain the axial position of the shank 138 relative to the shaft 108.

The first swivel assembly 122 may further include an anti-rotation feature configured to prevent the force-translating member 132 from rotating about the Z-axis, i.e., about the shank 138, when the shank 138 is rotated. However, the force-translating member 132 may also allow pivoting of the paddle 128 about the X-axis, with respect to the force-translating member 132. In some embodiments, e.g., in which the force-translating member 132 includes a ball or the like, the anti-rotation feature may be or include one or more flappers 135, each of which may be shaped as a fin, disk, peg, protrusion, pin, rib, or any other structure that extends outward and/or generally parallel to the force-translating member 132. The flapper 135 may be received into one or more slots, for example, a slot 137a defined in the paddle 138 and a slot 137b defined in the plate 139. The slots 137a, 137b may extend outward from the openings 130, 147 or may be offset therefrom and, e.g., generally parallel thereto. The slots 137a, 137b may have a complementary shape to the flapper 135. In at least one embodiment, the flapper 135 may have a curved outer edge to promote smooth pivoting of the paddle 146 about the X-axis with respect to the force-translating member 132, and thus the slots 137a, 137b may be radiused.

In other embodiments, the anti-rotation feature may refer to the shape of the force-translating member 132 and/or the shape of the opening 130 of the paddle 128 and/or the shape of the opening 141 of the plate 139. For example, if the force-translating member 132 has one or more non-spherical portions (e.g., prolate or oblate spheroidal portions, flats, corners, etc.), and the opening 130 of the paddle 128 (or the opening 141 of the plate 139) has complementary non-circular portions, the non-circular portions of the opening 130 of the paddle 128 may engage the non-spherical portions of the force-translating member 132 and prevent the force-translating member 150 from rotation about the Z-axis with respect to the paddle 146, while allowing the paddle 146 to pivot about the X-axis with respect thereto. In yet other embodiments, e.g., where the force-translating member 132 is a rod or bar, the anti-rotation feature may be provided by the insertion of the rod or bar into the one or more blind holes. Although several examples for establishing a pivotal linkage between the force-translating member 132 and the paddle 128 are described, various other pivotal linkages are contemplated and may be employed without departing from the scope of the present disclosure.

Turning to the second swivel assembly 124, the second swivel assembly 124 may include an adjustment knob 143, with a shank 142 extending therefrom. The shank 142 and the adjustment knob 143 may be integrally formed as a single piece or may be formed from two or more pieces coupled together. As can be appreciated from FIGS. 1 and 2, the first and second adjustment knobs 136, 143 may extend from the same side of the adjustable swivel mount 100, which may facilitate installation in some situations.

Further, the second swivel assembly 124 may include a swivel bracket 144, which may define a hole 145 through which the shank 142 may be received. The swivel bracket 144 may also be coupled with (e.g., fastened, threaded, welded, adhered, and/or brazed to or integral with) the shaft 108, as shown. For example, the swivel bracket 144 may be fixed to the shaft 108, so as to be rotatable therewith.

The second swivel assembly 124 may also include a paddle 146 defining an opening 148 therethrough. The second swivel assembly 124 may further include a force-translating member 150 which may be pivotally coupled with the paddle 146. In at least one embodiment, the second swivel assembly 124 may further include a plate 154 defining an opening 155 therein. The plate 154 may be coupled, e.g., fastened, to the paddle 156.

The force-translating member 150 may be similar to the force-translating member 132, and thus, in some embodiments, may be a "ball" (i.e., a sphere, hemisphere, spheroid, etc.), a cylinder, any prismatic shape, or the like. In such embodiments, the force-translating member 150 may be received in the opening 148 of the paddle 146 and the opening 155 of the plate 154. Each opening 148, 155 may be sized to receive the force-translating member 150, but prevent it from sliding therethrough. Accordingly, the force-translating member 150 may be pivotally entrained between the paddle 146 and the plate 154. In other embodiments, the force-translating member 150 may be or include a bar or rod extending across the opening 148 and rotatably received into holes defined in the paddle 146.

Moreover, the second swivel assembly 124 may include an anti-rotation feature configured to prevent the force-translating member 150 from rotating about the Z-axis, i.e., about the shank 142, when the shank 142 rotates. However, the anti-rotation feature may also allow the paddle 146 to pivot about the Y-axis with respect to the force-translating member 150. In some embodiments, the anti-rotation feature may be or include one or more flappers 151, as shown, each of which may be formed as a disk, peg, protrusion, pin, rib, or any other structure that extends outward from and/or parallel to the force-translating member 150 and into one or more slots, for example, a slot 151a defined in the paddle 146 and a slot 151b defined in the plate 154. The slots 151a, 151b may have a complementary shape to the flapper 151. In at least one embodiment, the flapper 151 may have a curved outer edge to promote smooth pivoting of the paddle 146 with respect thereto, and thus the slots 151a, 151b may be radiused.

In some embodiments, the flapper 151 may have a curved edge to promote smooth pivoting of the paddle 146 relative to the force-translating member 150. In other embodiments, the anti-rotation feature may refer to the shape of the force-translating member 150 and/or the shape of the opening 148 of the paddle 146 and/or the shape of the opening 155 of the plate 154. For example, if the force-translating member 150 has one or more non-spherical portions (e.g., flats, corners, etc.), and the opening 148 of the paddle 146 (or the opening 155 of the plate 154) has complementary non-circular portions, the non-circulator portions of the opening 148 of the paddle 146 may engage the non-spherical portions of the force-translating member 150 and prevent the force-translating member 150 from rotation about the Z-axis with respect to the paddle 146, while allowing the paddle 146 to pivot about the Y-axis with respect thereto.

The force-translating member 150 may also define an opening 152, which may, in an embodiment, be at least partially threaded. In some embodiments, e.g., where the force-translating member 150 is a ball or the like, the opening 152 may be defined as extending therethrough. In other embodiments, e.g., where the force-translating member 150 is a bar or rod, the opening 152 may be defined through an outward extension from the bar or rod. A variety of locations and configurations for the opening 152 are contemplated.

Moreover, the shank 142 and the opening 152 may each be at least partially threaded. The threads of the shank 142 may mesh with the threads of the opening 152. Additionally, the shank 142 may extend through another hole (not viewable) in the reverse side of the swivel bracket 144. The second swivel assembly 124 may include a shaft lock 157, which may be receivable onto the shank 142, so as to retain the shank 142 received through the opening in the reverse side of the swivel bracket 144. In addition to the adjustment knob 143, the shaft lock 157 may fix the axial position of the shank 138 with respect to the swivel bracket 144. Although several examples for establishing a pivotal linkage between the force-translating member 150 and the paddle 146 are described, various other pivotal linkages are contemplated and may be employed without departing from the scope of the present disclosure.

Further, the paddle 146 may further include a transverse bore 158, which may be aligned with a shaft hole 160 defined in the swivel bracket 144. A pin 162 may be received through the shaft hole 160 and the transverse bore 158, such that the paddle 146 may be angularly displaceable (pivotal) about the Y-axis, with respect to the swivel bracket 144, but may be pivotal with the swivel bracket 144 as the swivel bracket 144 is pivoted by the shaft 108 of the first swivel assembly 122.

The paddle 146 may also define a groove 164 extending at least partially around the transverse bore 158. Further, the swivel bracket 144 may define a lock hole 165 extending, for example, parallel to the shaft 108 and perpendicular to the transverse bore 158 and the pin 162. The adjustable swivel mount 100 may further include a lock bolt 166, which is receivable, e.g., threaded, through the lock hole 165. A distal tip 168 of the second lock bolt 166 may be complementary in shape to the groove 164, such that the distal tip 168 is snugly receivable into the groove 164, so as to positionally lock the paddle 146 from pivoting about the Y-axis. Accordingly, the lock bolt 166 may be advanced perpendicular to and toward a central axis of the transverse bore 158 and the pin 162 and received into the groove 164. As such, the paddle 146 may be positionally fixed relative to the swivel bracket 144 while avoiding an application of a torque force thereto.

Figure 3:
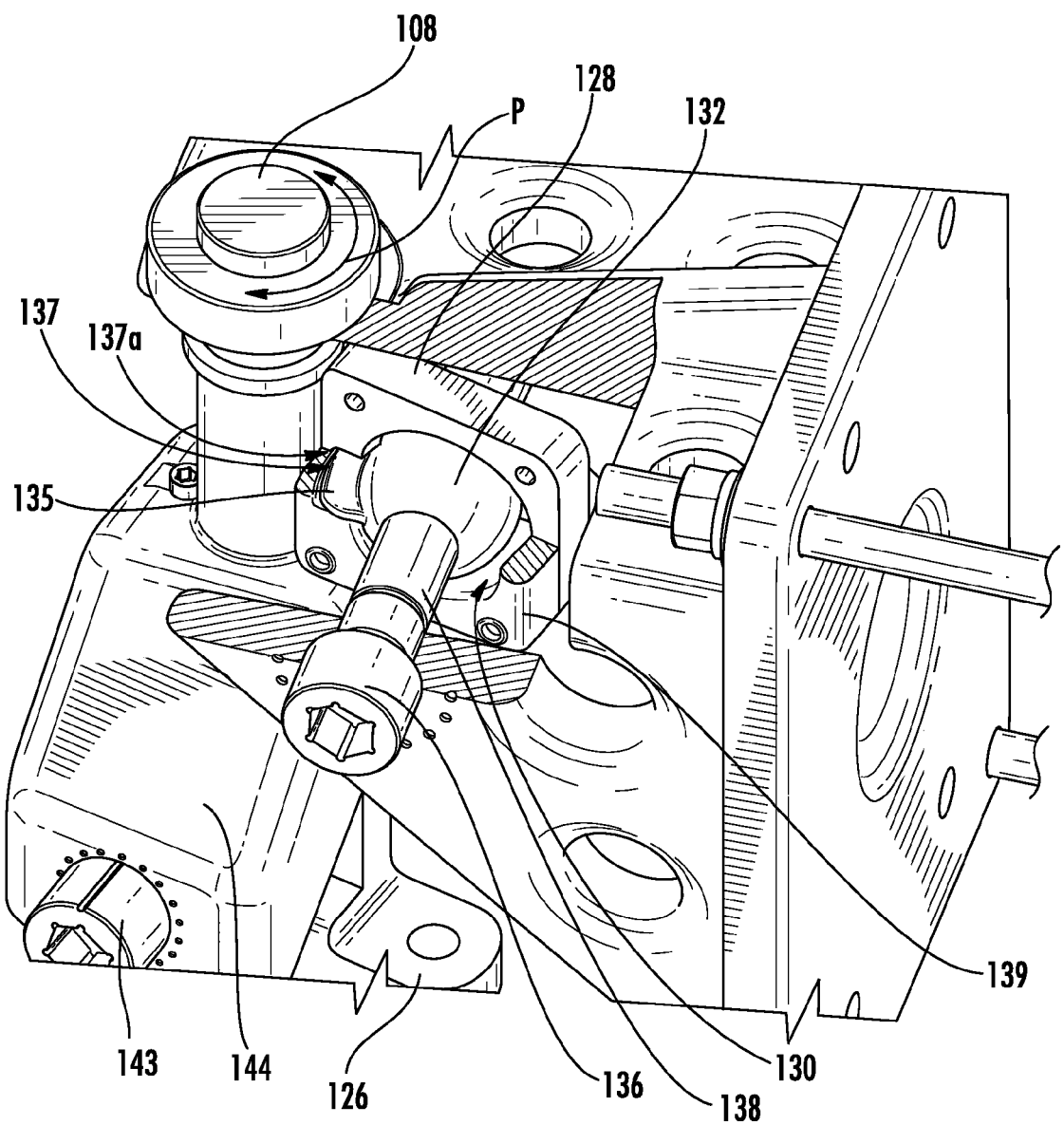
FIG. 3 illustrates a partial perspective view of a section of the adjustable swivel mount, according to an embodiment.

With continuing reference to FIGS. 1 and 2, FIG. 3 illustrates a perspective view of the first swivel assembly 122, according to an embodiment. More particularly, FIG. 3 illustrates operation of the illustrated first swivel assembly 122. As shown, the force-translating member 132 of the first swivel assembly 122 is received into the opening 130 of the paddle 128 and entrained there by the plate 139 (shown in partial section for illustrative purposes). Further, the paddle 128 and the plate 139 define the slots 137a, 137b, respectively, into which the flapper 135 is received. As shown, the flapper 135 may be curved and the slots 137a, 137b may be radiused to promote smooth pivoting of the paddle 128 (and thus the shaft 108). However, this is but one embodiment among many contemplated.

Thus, in an example of operation, when the adjustment knob 136 is rotated, the shank 138 is also rotated. The shank 138 may be threaded, and may be received into the opening 134 of the force-translating member 132, which may also be threaded. The force-translating member 132, however, may be constrained from advancement with respect to the paddle 128, and from rotation with the shank 138, as discussed above. As also noted above, the axial position of the shank 138 may be constrained relative to the shaft 108. Accordingly, rotation of the threaded shank 138 relative to the force-translating member 132 may apply a linear force on the force-translating member 132, forcing it to move toward or away from the adjustment knob 136, depending on the direction in which the shank 138 is rotated.

Such linear force may be transmitted from the force-translating member 132 to the paddle 128, thereby applying torque to the shaft 108, with the paddle 128 acting as a moment arm. With the shaft 108 being free to rotate, e.g., with the lock bolt 118 (FIG. 2) not being fully engaged, the shaft 108 may pivot in response to the torque applied by rotating the adjustment knob 136.

The shaft 108 may thus be pivoted about the X-axis across an angular range P by rotating the adjustment knob 136. In various embodiments, the angular range P may be, for example, between about 10° and about 90°, about 15° and about 45°, or about 20° and about 40°. In at least one specific embodiment, the angular range P may be between about 10° and about 30°. Further, the threading of the shank 138 and the opening 134 in the force-translating member 132 may be relatively fine, e.g., such that the shaft 108 may pivot by about 0.1° per rotation of the adjustment knob 136.

Pivoting of the shaft 108 may be transmitted to the swivel bracket 144, such that the swivel bracket 144 is also pivoted, for example, on a 1:1 basis, although other relationships, e.g., geared transmission, is not outside the scope of the present disclosure. Furthermore, the pivoting of the swivel bracket 144 about the X-axis may be transmitted to pivoting the paddle 146 of the second swivel assembly 124 about the X-axis via the connection with the pin 162. Further, such pivoting of the paddle 146 about the X-axis may be transmitted to the mount 126, to which the device being aligned and/or mounted may be coupled.

The second swivel assembly 124 may operate analogously to the way in which the first swivel assembly 122 has been described as operating, but may operate to pivot the mount 126 about the Y-axis with respect to the swivel bracket 144. Thus, referring again to FIG. 2, the rotation of the adjustment knob 143 may cause the shank 142 to rotate. The anti-rotation feature (e.g., the flapper 151 received into the slots 151a and/or 151b) of the force-translating member 150 may prevent the force-translating member 150 from rotating with the shank 142 about the Z-axis. Since the axial position of the shank 142 may be constrained, the rotation of the shank 142 may thus cause the force-translating member 150 to move axially along the Z-axis. The force-translating member 150 may be engaged in a pivotal linkage with the paddle 146, and thus the Z-axis movement of the force-translating member 150 may cause the paddle 146 to pivot about the Y-axis.

Accordingly, the paddle 146 may be pivoted about the pin 162 by rotation of the adjustment knob 143. The pivoting of the paddle 146 may pivot the position of the mount 126 correspondingly, for example, in a 1:1 relationship with respect to angular pivoting. Further, the range of pivoting of the paddle 146 about the X-axis may be, for example, between about 10° and about 90°, about 15° and about 45°, or about 20° and about 40°. In at least one specific embodiment, the angular range of pivoting may be between about 10° and about 30°. Further, the threading of the shank 142 and the opening 152 in the force-translating member 132 may be relatively fine, e.g., such that the mount 126 may pivot by about 0.1° per rotation of the adjustment knob 143.

Thus, it will be appreciated that dual pivoting motion may be achieved by adjustment knobs 136, 143, which may be disposed on the same side of the bracket 106 to facilitate installation. Further, once a desired pivotal location about the X and Y axes is reached via rotation of the adjustment knobs 136, 143, the position can be locked into place by advancing the lock bolts 118, 166 into the respective grooves 114, 164. Since the lock bolts 118, 166 advance toward the centerline of the shaft 108 and pin 162, respectively, such advancement of the lock bolts 118, 166 substantially avoids angularly displacing the shaft 108 and pin 162, thereby avoiding misalignment caused by such locking.

Figure 4:
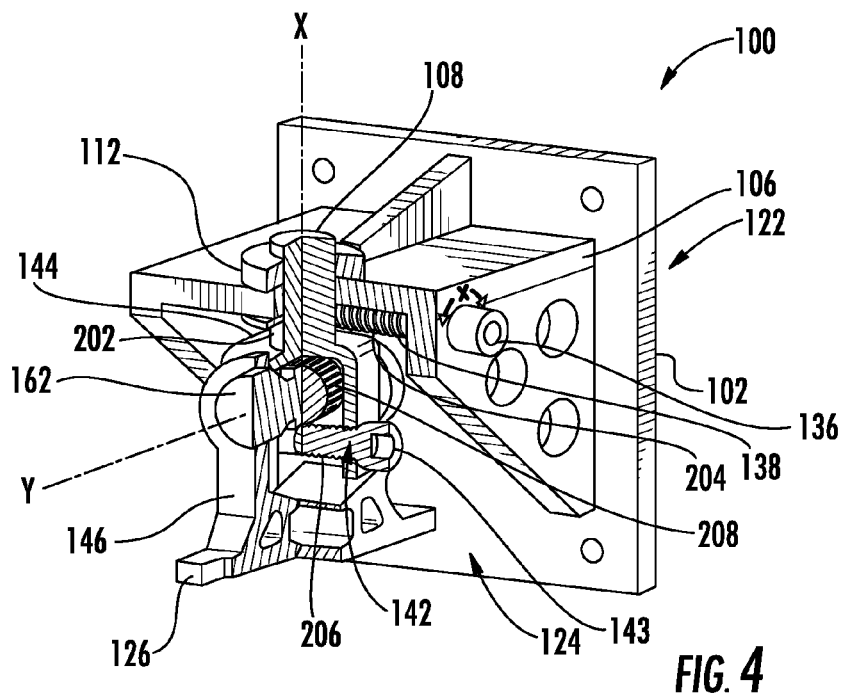
FIG. 4 illustrates a partial perspective view of a section of another embodiment of the adjustable swivel mount.
Figure 5:
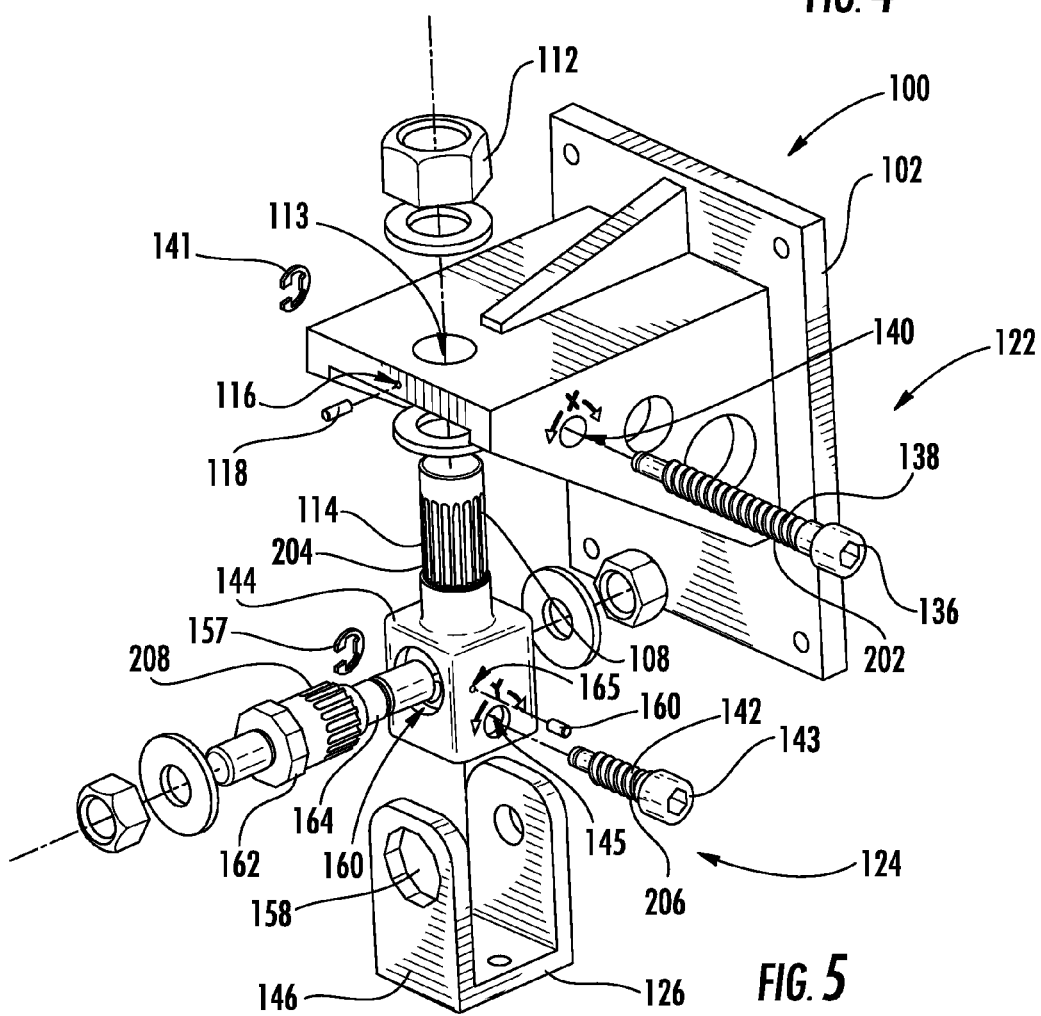
FIG. 5 illustrates a perspective view of another embodiment of the adjustable swivel mount.

FIGS. 4 and 5 illustrate a partial sectional, perspective view and raised perspective view, respectively, of the adjustable swivel mount 100 according to at least one second embodiment. The embodiments of the adjustable swivel mount 100 shown in FIGS. 4 and 5 may be similar to the embodiments of FIGS. 1-3, and thus like-functioning and/or like-structured components are given like numerals and will not be described in detail again.

As shown, rather than employing the balls 132, 150, the first and second swivel assemblies 122, 124 may each include a worm-drive configuration. Accordingly, in the first swivel assembly 122, the shaft 108 may include teeth 202, and the shank 138 may include threads 204, such that the teeth 202 of the shaft 108 mesh with the threads 204 of the shank 138. Rotation of the shank 138 via rotation of the adjustment knob 136 may be transmitted directly into pivoting the shaft 108 by the meshed threads of the shank 138 and the shaft 108. Thus, rotation of the shank 138 by rotating of the adjustment knob 136 may result in pivoting the mount 126 about the X-axis.

Like the first swivel assembly 122 in this embodiment, the shank 142 of the second swivel assembly 124 may include threads 206, and the pin 162 may including teeth 208, such that the teeth 208 of the pin 162 and the threads 206 of the shank 142 mesh. Rotation of the shank 142 by rotation of the adjustment knob 143 may result in pivoting of the mount 126 about the Y-axis. Furthermore, in the illustrated second embodiment, the swivel bracket 144 extends from the shaft 108, e.g., integrally, although it may be otherwise coupled to the shaft 108. In at least one embodiment, the mount 126 may be integral with the paddle 146, such that the paddle 146 and the mount 126 together provide a U-shaped bracket (see FIG. 5). Further, the pin 162 may remain pivotal with respect to the swivel bracket 144, but may be pivotally secured to the paddle 146. Accordingly, pivoting of the pin 162 caused by rotation of the shank 142 and the adjustment knob 143 may be transmitted to the paddle 146, causing it to pivot as well.

It will be appreciated that embodiments of the adjustable swivel mount 100 may include the first swivel assembly 122 having the force-translating member 132 and the second swivel assembly 124 having the worm-drive configuration, or the first swivel assembly 122 having the worm drive configuration and the second swivel assembly 124 having the force-translating member 150 (i.e., combining features from the two illustrated embodiments) without departing from the scope of the present disclosure.

Figure 6:
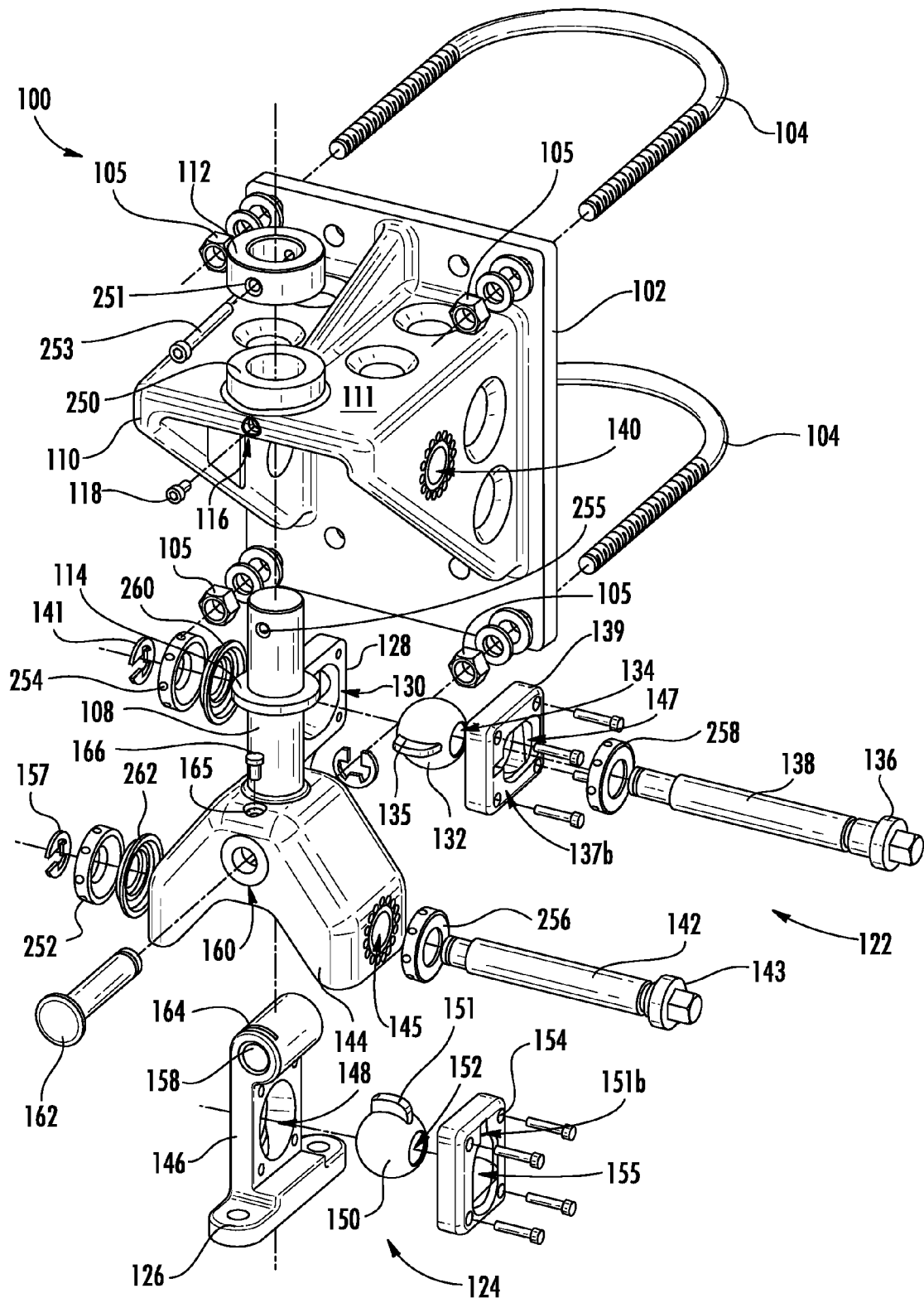
FIG. 6 illustrates an exploded, perspective view of another embodiment of the swivel mount.

FIG. 6 illustrates another embodiment of the swivel mount 100. The swivel mount 100 of FIG. 6 may be generally similar in form and function to the swivel mount 100 shown in, e.g., FIG. 2, and described above with reference thereto. As such, like elements are indicated by like reference numerals and will not be described again. As shown in FIG. 6, the swivel mount 100 may additionally include an annular boss 250, which may be disposed between the top surface 111 of the bracket 106 and aligned with the shaft hole 113, so as to receive the shaft 108 therethrough. The bushing 112 may be set down on top of the boss 250, and aligned (e.g., concentric) with the shaft hole 113 and the boss 250. Further, the bushing 112 may additionally define a lock hole 251, into which a pin 253 may be received. The pin 253 may also be received through a pin hole 255 defined in the shaft 108, thereby holding the shaft 108 in place with respect to the bracket 106.

The swivel mount 100 may also include a plurality of lock nuts 252, 254, 256, and 258 and lock washers 260, 262, as shown. The lock nuts 252-258 and lock washers 260, 262 may each engage one of the shanks 138, 142, so as to lock therewith and prevent vibration or small movements between the shanks 138, 142 and the remainder of the swivel assembly 100. Further, the lock bolt 166 may provide a micro lock, configured to grip the lock hole 165 or otherwise maintain its position with respect thereto, so as to avoid loosening due to vibration or other types of movement.

Figure 7:
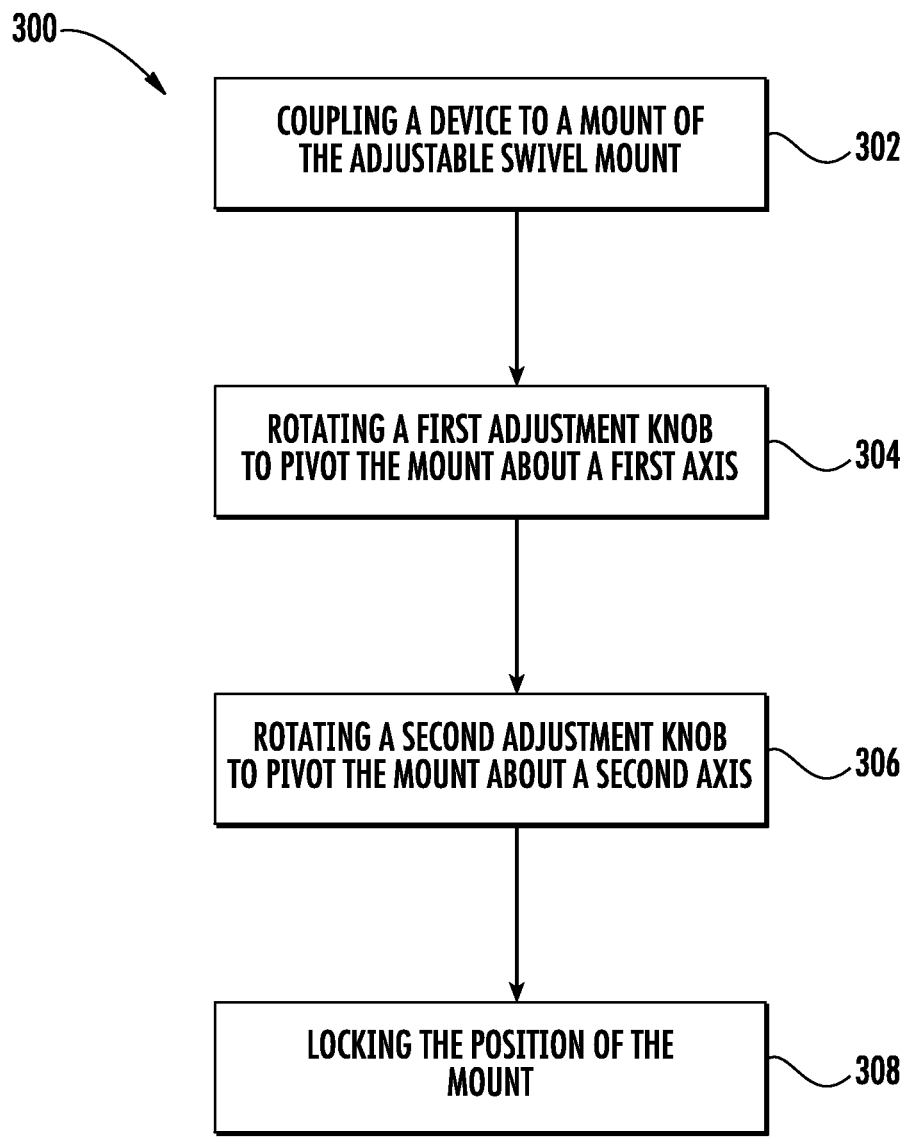
FIG. 7 illustrates a flowchart of a method for mounting a device, according to an embodiment.

FIG. 7 illustrates a flowchart of a method 300 for adjusting a device on an adjustable swivel mount, according to an embodiment. The method 300 may proceed by operation of one or more embodiments of the adjustable swivel mount 100 discussed and described above, and may thus be best understood with reference thereto.

The method 300 may begin by coupling the device to a mount of an adjustable swivel mount, as at 302. Such coupling at 302 may proceed by fastening, welding, brazing, adhering, etc., the device to the mount, such that the device is fixed for movement along with the mount.

The method 300 may also include rotating a first adjustment knob disposed on a first side of the adjustable swivel mount, as at 304. Rotating the first adjustment knob at 304 may cause a shaft coupled to a bracket of the adjustable swivel mount to pivot about a first axis. Further, the shaft pivoting about the first axis may cause the mount to pivot about the first axis, and thus pivot the device about the first axis as well.

The method 300 may further include rotating a second adjustment knob disposed on the first side of the adjustable swivel mount, as at 306. Rotating the second adjustment knob at 306 may cause a paddle coupled to a swivel bracket to pivot about the second axis. Further, the paddle pivoting about the second axis may cause the mount, and thus the device fixed thereto, to pivot about the second axis.

In at least one embodiment, the device may be a laser transmitting device, with the laser being desired to be aimed at a receiver. Accordingly, adjustment of the pivotal position of the device about the first axis by the rotation at 302 may align the laser with the receiver in a first direction. For example, a pivotal position may be selected where the laser is viewed as incident on a pole to which the receiver is coupled.

The method 300 may then proceed to adjusting the pivotal position of the device about the second axis by rotating the second adjustment knob at 306. With the laser incident on the pole (or other support surface), e.g., visibly incident, pivoting in the second direction may adjust the elevation of the location of the laser. Accordingly, the laser's target may be adjusted vertically along the pole, until reaching the laser receiver. In some embodiments, further fine adjustment of the position about the first axis, after adjustment of the position about the second axis, may be provided.

Once each position about the first and second axes is determined, the position may be locked in place, as at 308. Each position may be locked as it is determined, or locking of the positions can take place after both positions have been determined In at least one embodiment, locking the position about the first axis may include receiving a lock bolt into a groove of the shaft of the first swivel assembly. Further, locking the position about the second axis may include receiving a lock bolt into a groove of the pin of the second swivel assembly.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings.

It will be appreciated that structural components and/or processing stages may be added or existing structural components and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side," "higher," "lower," "over," "top," and "under" are defined with respect to the conventional plane or working surface, regardless of the orientation of the workpiece.

What is claimed is:

1. An apparatus for mounting a device, comprising:
a bracket configured to be coupled to a support structure;
a shaft pivotally coupled with the bracket;
a first adjustment knob, wherein rotation of the first adjustment knob causes the shaft to pivot about a first axis;
a swivel bracket coupled with the shaft such that the shaft pivoting causes the swivel bracket to pivot about the first axis;
a first paddle coupled with the swivel bracket such that the swivel bracket pivoting about the first axis causes the first paddle to pivot about the first axis;
a second adjustment knob, wherein rotation of the second adjustment knob causes the first paddle to pivot about a second axis; and
a mount coupled to the first paddle and configured to couple to the device, wherein pivoting the first paddle about the first axis causes the mount to pivot about the first axis, and pivoting the first paddle about the second axis causes the mount to pivot about the second axis.

2. The apparatus of claim 1, further comprising a force-translating member coupled with the second adjustment knob and with the first paddle, such that rotation of the second adjustment knob causes the force-translating member to move linearly with respect to the second adjustment knob.

3. The apparatus of claim 2, further comprising a shank extending from the second adjustment knob such that rotation of the second adjustment knob rotates the shank, wherein the force-translating member defines an opening receiving the shank.

4. The apparatus of claim 3, wherein the opening of the force-translating member is threaded and the shank comprises a threaded portion received into the opening of the force-translating member.

5. The apparatus of claim 4, further comprising an anti-rotation feature configured to prevent the force-translating member from rotating about the shank when the shank rotates.

6. The apparatus of claim 5, further comprising a plate coupled with the first paddle, wherein the first paddle and the plate each define an opening into which the force-translating member is received such that the force-translating member is pivotally entrained between the plate and the first paddle.

7. The apparatus of claim 6, wherein the anti-rotation feature comprises a structure extending from the force-translating member and a slot defined in the plate, the first paddle, or both, the slot receiving the structure.

8. The apparatus of claim 7, wherein the force-translating member comprises a ball and the structure comprises a flapper extending from the ball.

9. The apparatus of claim 1, further comprising:
a second paddle extending from the shaft;
a force-translating member pivotally coupled with the second paddle;
a shank extending from the first adjustment knob such that rotation of the first adjustment knob causes the shank to rotate, wherein the shank is coupled with the force-translating member such that rotation of the shank causes the force-translating member to axially translate; and
an anti-rotation feature preventing the force-translating member from rotating about the shank when the shank rotates.

10. The apparatus of claim 1, further comprising a lock bolt having a distal tip, wherein:
the bracket defines a first hole through which the shaft is rotatably received, and a lock hole extending transverse to and intersecting the first hole, the lock bolt being receivable through the lock hole; and
the shaft defines a groove therein, the groove aligning with the lock hole when the shaft is received into the first hole, the distal tip of the lock bolt being configured to be received into the groove so as to lock an angular position of the shaft.

11. The apparatus of claim 1, further comprising:
a pin received at least partially through the swivel bracket and through a transverse hole defined in the first paddle, such that the first paddle is pivotally coupled to the swivel bracket, wherein the pin comprises teeth; and
a shank extending from the second adjustment knob such that rotation of the second adjustment knob rotates the shank, the shank defining threads thereon, the threads of the shank being configured to mesh with the teeth of the pin.

12. The apparatus of claim 1, further comprising:
a pin received through the swivel bracket and through a transverse hole defined in the first paddle, such that the first paddle is pivotally coupled to the swivel bracket; and
a lock bolt receivable through a lock hole defined in the swivel bracket, the lock bolt comprising a distal tip receivable into the groove of the pin, such that tightening the lock bolt locks an angular position of the pin.

13. The apparatus of claim 1, wherein:
the mount is pivotable about the first axis by from about 10° to about 30°; and
the mount is pivotable about the second axis by from about 10° to about 30°.

14. The apparatus of claim 1, wherein the first and second adjustment knobs are disposed on a same side of the apparatus.

15. A method for mounting a device, comprising:
coupling the device to a mount of an adjustable swivel mount;
rotating a first adjustment knob disposed on a side of the adjustable swivel mount, wherein rotating the first adjustment knob causes a shaft coupled to a bracket of the adjustable swivel mount to pivot about a first axis, and wherein the shaft pivoting about the first axis causes the mount to pivot about the first axis; and
rotating a second adjustment knob disposed on the side of the adjustable swivel mount, wherein rotating the second adjustment knob causes a paddle coupled to a swivel bracket to pivot about the second axis, and wherein the paddle pivoting about the second axis causes the mount to pivot about the second axis.

16. The method of claim 15, further comprising:
coupling a bracket to a support structure, wherein the mount is supported by the bracket and
disposing a first lock bolt through a lock hole defined in the bracket, the bracket being pivotally coupled to the shaft, such that a distal tip of the first lock bolt is received into a groove defined in the shaft, wherein the distal tip and the groove are complementarily shaped.

17. The method of claim 15, further comprising:
disposing a second lock bolt through a swivel bracket pivotally coupled to the paddle and fixed to the shaft, such that a distal tip of the second lock bolt is received into a groove defined in the paddle, wherein the distal tip and the groove are complementarily shaped.

18. The method of claim 15, wherein rotating the first adjustment knob further causes a first shank extending from the first adjustment knob to advance in an opening of a first force-translating member, the first force-translating member being pivotally coupled with a second paddle extending from the shaft.

19. The method of claim 15, wherein rotating the first adjustment knob causes threads on a first shank extending from the first adjustment knob engage teeth of the shaft.

20. An adjustable swivel mount, comprising:
a base plate configured to be secured to a support surface;
a bracket extending substantially normal to the base plate, the bracket defining a shaft hole and a lock hole therein;
a first swivel assembly, comprising:
a first shaft received through the shaft hole and pivotal with respect to the bracket;
a first paddle extending from the shaft and defining a first opening;
a first ball comprising a first flapper and defining a first ball opening, the first ball being received into the first opening;
a first plate coupled with the first paddle and defining an opening into which the first ball is received, so as to pivotally entrain the first ball between the first plate and the first paddle, wherein the first plate, the first paddle, or both define a slot into which the first flapper is received;
a first shank received into the first ball opening; and
a first adjustment knob coupled with the first shank, such that rotation of the first adjustment knob causes the first shank to rotate and rotation of the first shank causes the first ball to move along the first shank and pivot the shaft about a first axis; a second swivel assembly, comprising:
a swivel bracket fixed to the shaft;
a pin received through the swivel bracket;
a second paddle pivotally coupled to the swivel bracket by the pin, the second paddle defining a second opening;
a second ball comprising a second flapper and defining a second ball opening, the second ball being received into the second opening of the second paddle;
a second plate coupled with the second paddle and defining an opening into which the second ball is received, so as to pivotally entrain the second ball between the second plate and the second paddle, wherein the second plate, the second paddle, or both define a slot into which the second flapper is received;
a second shank received into the second ball opening; and
a second adjustment knob coupled with the second shank, such that rotation of the second adjustment knob causes the second shank to rotate, wherein rotation of the second shank causes the second ball to move along the second shank and pivot the second paddle about a second axis; and
a mount coupled with the first and second swivel assemblies, such that pivoting the shaft of the first swivel assembly pivots the mount about the first axis and pivoting the second paddle of the second swivel assembly pivots the mount about the second axis.

\* \* \* \* \*